United States Patent
Nishikawa (10) Patent No.: US 10,792,745 B2
(45) Date of Patent: Oct. 6, 2020

(54) CONTROLLER FOR WIRE ELECTRICAL DISCHARGE MACHINE AND CONTROL METHOD OF WIRE ELECTRICAL DISCHARGE MACHINE

(71) Applicant: FANUC CORPORATION, Yamanashi (JP)

(72) Inventor: Ryou Nishikawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 3 days.

(21) Appl. No.: 16/182,949

(22) Filed: Nov. 7, 2018

(65) Prior Publication Data
US 2019/0143432 A1    May 16, 2019

(30) Foreign Application Priority Data
Nov. 14, 2017    (JP) .................................. 2017-219104

(51) Int. Cl.
*B23H 7/20*    (2006.01)
*B23H 7/18*    (2006.01)
*B23H 7/06*    (2006.01)

(52) U.S. Cl.
CPC ................. *B23H 7/20* (2013.01); *B23H 7/06* (2013.01); *B23H 7/18* (2013.01); *B23H 2600/12* (2013.01)

(58) Field of Classification Search
CPC . B23H 7/06; B23H 7/065; B23H 7/18; B23H 7/20; B23H 2600/12
See application file for complete search history.

(56) References Cited

U.S. PATENT DOCUMENTS

| 5,185,507 A | * | 2/1993 | Yasui | ..................... | B23H 7/065 |
| | | | | | 219/69.12 |
| 2004/0011767 A1 | | 1/2004 | Hattori et al. | | |

(Continued)

FOREIGN PATENT DOCUMENTS

| CN | 106475645 A | 3/2017 |
| JP | S5420496 A | 2/1979 |

(Continued)

OTHER PUBLICATIONS

Werner Andrzej: "Method for enhanced accuracy in machining curvilinear profiles on wire-cut electrical discharge machines", Precision Engineering, Elsevier, Amsterdam, NL, vol. 44, Oct. 21, 2015 (Oct. 21, 2015), pp. 75-80, XP029423435, ISSN: 0141-6359, DOI: 10.1016/J. Precisioneng.2015.10.004.

(Continued)

*Primary Examiner* — Tu B Hoang
*Assistant Examiner* — Erin E McGrath
(74) *Attorney, Agent, or Firm* — Robert P. Michal, Esq.; Carter, DeLuca & Farrell LLP (57) ABSTRACT

A controller for a wire electrical discharge machine that machines a workpiece along a machining path by relatively moving the workpiece and a wire electrode to each other while generating electric discharge across an electrode gap between the workpiece and the wire electrode, includes: a machining surface state acquisition unit configured to acquire the state of a machining surface of the workpiece; and a machining path setting unit configured to specify an excessively machined portion of the workpiece based on the acquired state of the machining surface and set an approach point at which the wire electrode is made to approach the machining surface from a machining start point, so as to avoid the excessively machined portion.

14 Claims, 10 Drawing Sheets

(56) References Cited

U.S. PATENT DOCUMENTS

| | | |
|---|---|---|
| 2004/0178179 A1 | 9/2004 | Ogata et al. |
| 2004/0256362 A1 | 12/2004 | Sato et al. |
| 2005/0040142 A1 | 2/2005 | Kawahara et al. |

FOREIGN PATENT DOCUMENTS

| | | |
|---|---|---|
| JP | S5621733 A | 2/1981 |
| JP | H04189421 A | 7/1992 |
| JP | 2004276127 A | 10/2004 |
| JP | 2005066738 A | 3/2005 |
| JP | 3721366 | 9/2005 |
| JP | 3838199 | 8/2006 |
| WO | 03037558 A1 | 5/2003 |

OTHER PUBLICATIONS

Yueping Chen Et al: "Spatial statistical analysis and compensation of machining errors for complex surfaces", Precision Engineering, vol. 37, No. 1, Jan. 1, 2013 (Jan. 1, 2013), pp. 203-212, XP055576870, Amsterdam, NL, ISSN: 0141-6359, DOI: 10.1016/j. precisioneng. 2012.08.003.

Decision to Grant a Patent issued by the Japanese Patent Office in relation to Japanese Application No. 2017-219104 dated Oct. 8, 2019 (3 pages) along with English language translation (2 pages).

\* cited by examiner

CONTROLLER FOR WIRE ELECTRICAL DISCHARGE MACHINE AND CONTROL METHOD OF WIRE ELECTRICAL DISCHARGE MACHINE

CROSS-REFERENCE TO RELATED APPLICATION

This application is based upon and claims the benefit of priority from Japanese Patent Application No. 2017-219104 filed on Nov. 14, 2017, the contents of which are incorporated herein by reference.

BACKGROUND OF THE INVENTION

Field of the Invention

The present invention relates to a controller and a control method for a wire electrical discharge machine which machines a workpiece along a machining path by moving the workpiece relative to a wire electrode while generating electric discharge between two electrodes, i.e., the workpiece and the wire electrode.

Description of the Related Art

Japanese Patent No. 3721366 discloses a configuration in which when multiple times of machinating processes are performed to cut a workpiece along a die shape, the approach position of the wire at the start of each cutting is changed, whereby a dent that would be produced by wire's overcutting on a cutting surface is prevented from occurring.

SUMMARY OF THE INVENTION

The technique of Japanese Patent No. 3721366 is configured to reduce the risk of formation of such dents, but cannot make the already-formed dent smaller, so that it has been impossible to create a highly precise machined surface.

The present invention has been devised in order to solve the above problem, and it is therefore an object of the present invention to provide a controller and a control method for a wire electrical discharge machine which can create a highly accurate machined surface.

According to a first aspect of the present invention, a controller for a wire electrical discharge machine that machines a workpiece along a machining path by relatively moving the workpiece and a wire electrode to each other while generating electric discharge across an electrode gap between the workpiece and the wire electrode includes: a machining surface state acquisition unit configured to acquire the state of a machining surface of the workpiece; and a machining path setting unit configured to specify an overcut (an excessively machined portion) of the workpiece based on the acquired state of the machining surface and set an access point at which the wire electrode approaches the machining surface from a machining start point, so as to avoid the overcut.

According to a second aspect of the present invention, a control method for a wire electrical discharge machine that machines a workpiece along a machining path by relatively moving the workpiece and the wire electrode to each other while generating electric discharge across an electrode gap between the workpiece and the wire electrode includes: a machining surface state acquiring step of acquiring the state of a machining surface of the workpiece; and a machining path setting step of specifying an overcut (an excessively machined portion) of the workpiece based on the acquired state of the machining surface, and setting an access point at which the wire electrode approaches the machining surface from a machining start point, so as to avoid the overcut.

According to the present invention, it is possible to obtain a machining surface with high accuracy.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Wire Electrical Discharge Machine and Controller]

Figure 1:
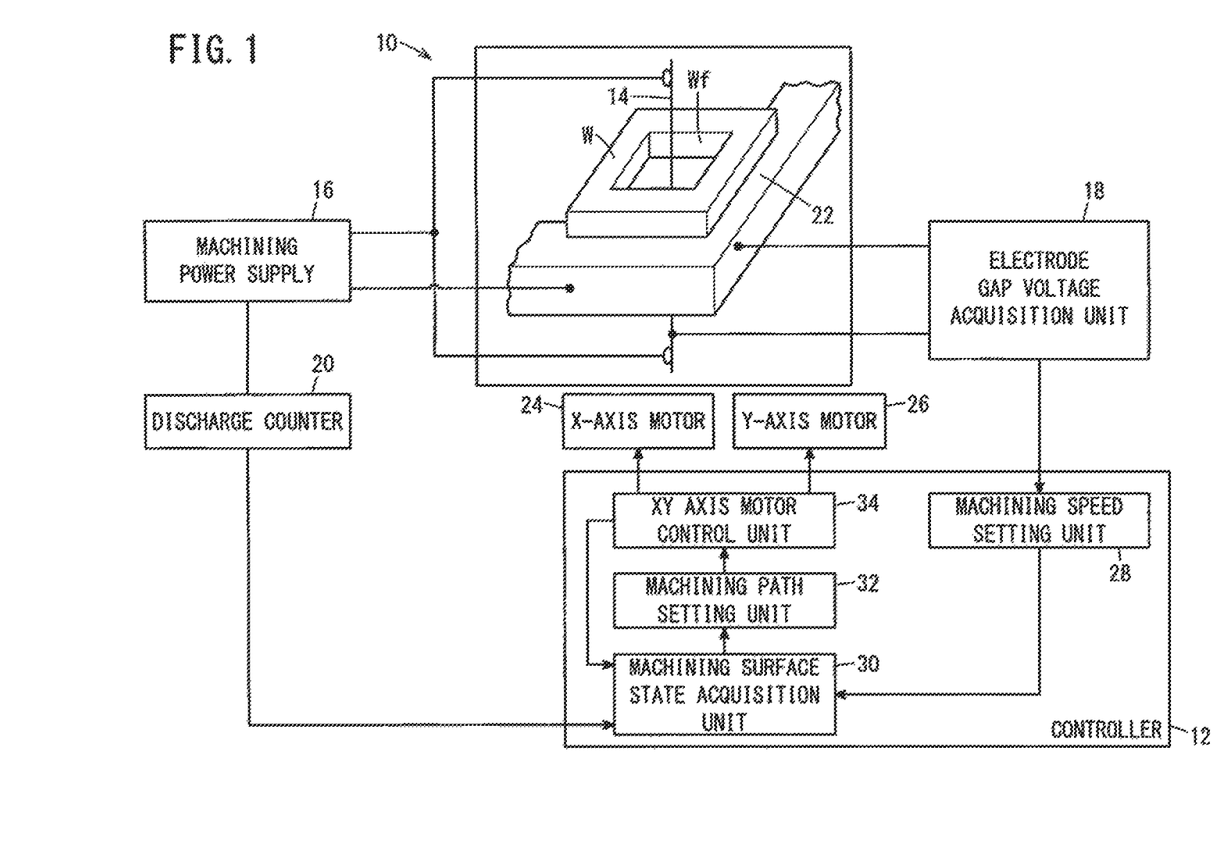
FIG. 1 is a schematic diagram showing a configuration of a wire electrical discharge machine and a controller for controlling the wire electrical discharge machine.

FIG. 1 is a schematic diagram showing a configuration of a wire electrical discharge machine 10 and a controller 12 for controlling the wire electrical discharge machine 10. The wire electrical discharge machine 10 is a machine tool that generates electrical discharge by applying voltage across an electrode gap between a wire electrode 14 and a workpiece W to thereby perform electrical discharge machining on the workpiece W. The wire electrode 14 is formed of a metal material such as tungsten-based, copper alloy-based and brass-based metal. On the other hand, the material of the workpiece W is, for example, an iron-based material, a superhard material (tungsten carbide) or the like. The wire electrical discharge machine 10 includes a machining power supply 16 for applying voltage between the wire electrode 14 and the workpiece W (which will be also referred to as the electrode gap), and an electrode gap voltage acquisition unit 18 for acquiring the voltage between the wire electrode 14 and the workpiece W (which will be also referred to as the gap voltage).

Further, the wire electrical discharge machine 10 includes a discharge counter 20 for acquiring the number of discharges across the electrode gap (which will be hereinafter referred to as the discharge count). The discharge counter 20 acquires, as the discharge count, the number of times of discharge generated across the electrode gap during electrical discharge machining, for example, based on change in the voltage output from the machining power supply 16. Further, the wire electrical discharge machine 10 has an X-axis motor 24 and a Y-axis motor 26 which move a worktable 22 on which the workpiece W is fixed, so as to move the workpiece W relative to the wire electrode 14.

The controller 12 includes a machining speed setting unit 28, a machining surface state acquisition unit 30, a machining path setting unit 32, and an XY axis motor control unit 34. The machining speed setting unit 28 sets the machining speed at which the workpiece W is relatively moved to the wire electrode 14 during electrical discharge machining. The machining speed is set according to the gap voltage, and the machining speed is set to be higher as the gap voltage is greater. It should be noted that when the discharge count at the electrode gap is smaller due to a long distance between the wire electrode 14 and the workpiece W, the electrode gap voltage becomes higher.

The machining surface state acquisition unit 30 receives input of the positional information on the worktable 22 from the aftermentioned XY axis motor control unit 34, and also receives input of the discharge count at the electrode gap from the discharge counter 20. The machining surface state acquisition unit 30 acquires the relative position between the wire electrode 14 and the workpiece W from the positional information of the worktable 22. Further, the machining surface state acquisition unit 30 acquires the distance between the wire electrode 14 and the machining surface Wf of the workpiece W. In a finishing process that is first performed after the rough machining (hereinafter referred to as the second machining), the machining surface state acquisition unit 30 determines that the machining surface Wf of the workpiece W is closer to the wire electrode 14 when the discharge count is greater, and that the machining surface Wf of the workpiece W is farther from the wire electrode 14 when the discharge count is smaller. The machining surface state acquisition unit 30 acquires the state of the machining surface Wf of the workpiece W from the discharge count and the relative position between the wire electrode 14 and the workpiece W.

The machining path setting unit 32 sets the route defined in advance by the NC program as a machining path R. The machining path setting unit 32 sets an access point A1, i.e., a position on the machining surface Wf of the workpiece W when the wire electrode 14 is moved close to the machining surface Wf of the workpiece W from the machining start point S in the finishing at and after the third machining, and a departure point A2, i.e., a position on the machining surface of the workpiece W when the wire electrode 14 is moved away from the machining surface Wf of the workpiece W and returned to the machining start point S. Normally, the departure point A2 is set at the same position as the access point A1, and in the present embodiment, the access point A1 and the departure point A2 are collectively referred to as an approach point A.

The XY axis motor control unit 34 controls the X-axis motor 24 and the Y-axis motor 26 in accordance with the machining path R set by the machining path setting unit 32 and the machining speed set by the machining speed setting unit 28.

[About Machining Path]

Figure 2A:
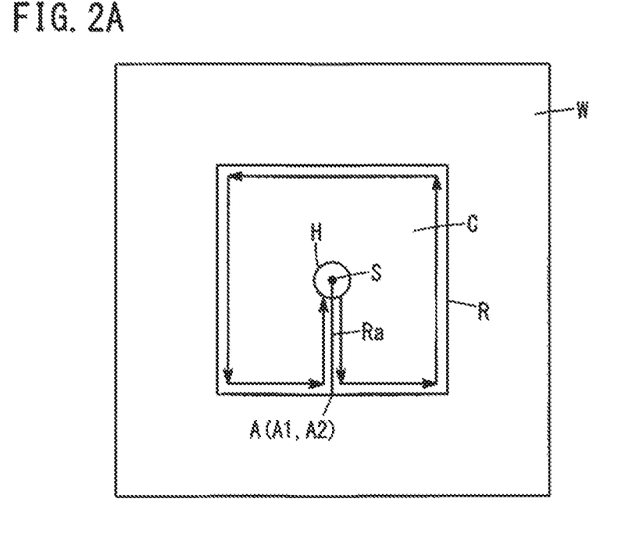
FIG. 2A is a diagram showing a machining path of a roughing process when a workpiece is machined along a die.
Figure 2B:
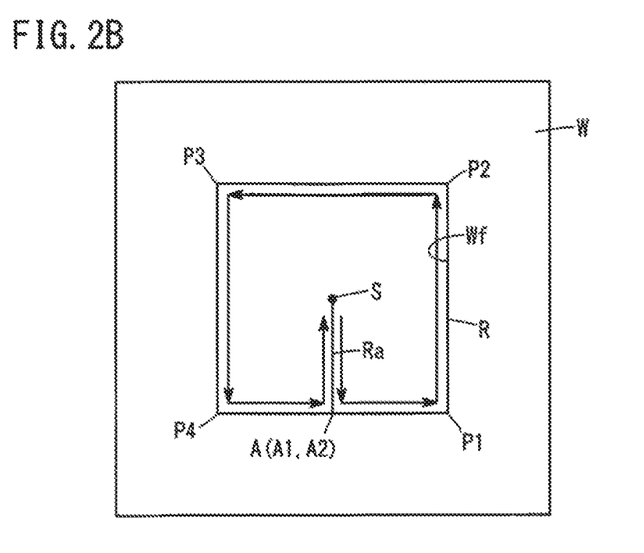
FIG. 2B is a diagram showing a machining path of a finishing process after the roughing process.

FIG. 2A is a diagram showing a machining path R of rough machining when a workpiece W is machined along a die. FIG. 2B is a diagram showing a machining path R for finishing after the rough machining.

When the workpiece W is machined along a die, rough machining is first carried out to cut and remove a core C, and then finishing is performed multiple times. In roughing, the wire electrode 14 is inserted into a machining start hole H formed in advance in the workpiece W. Then, the wire electrode 14 is moved from the current position of the wire electrode 14, i.e., the machining start point S, to the approach point A along the machining path R of the workpiece W. Hereinafter, the route between the machining start point S and the approach point A is referred to as an approach route Ra. Thereafter, the wire electrode 14 is moved along the machining path R. As the wire electrode 14 goes around the machining path R and returns to the approach point A, the core C is cut off from the workpiece W. Thereafter, the wire electrode 14 is returned to the machining starting point S along the approach route Ra. The core C thus cut is removed by a worker, an unillustrated core collecting machine or the like, and then the second machining as the first finishing is started. Also in finishing, basically the wire electrode 14 is moved on the same machining path R as the machining path in roughing, and returned to the machining start point S every time one machining process is completed.

[Overcut and Undercut]

Figure 3:
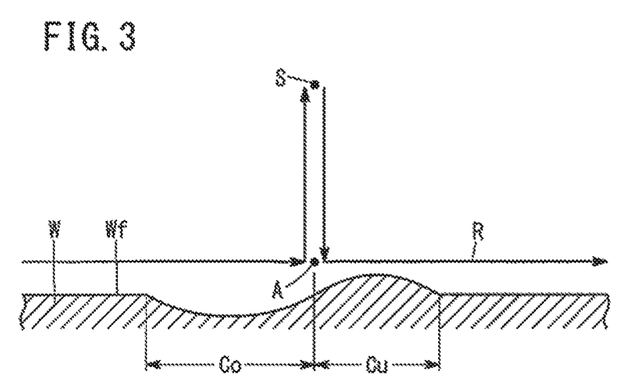
FIG. 3 is a schematic diagram showing an overcut portion and an undercut portion on a machining surface of a workpiece.

FIG. 3 is a schematic diagram showing an excessively machined portion (which will hereinafter be simply referred to as an overcut portion or an overcut) Co and an insufficiently machined portion (which will hereinafter be simply referred to as an undercut portion or an undercut) Cu on the machining surface Wf of the workpiece W. There are cases where irregularities are formed on the machining surface Wf of the workpiece W in electrical discharge machining. In particular, irregularities on the machining surface Wf are liable to be formed near the approach point A. This is considered to be because, in a single round of machining, the wire electrode 14 passes by the approach point A two times, i.e., at the start of machining and at the end of machining, and consequently the machining surface Wf is machined excessively, and also because the wire electrode 14 changes its direction of movement at the approach point A so that the wire electrode 14 cannot precisely follow the designated machining path, and consequently part of the machining surface Wf is left uncut (i.e., machined insufficiently). Further, some projections on the machining surface Wf may occur when the core C is cut in roughing and drops off the workpiece while leaving an uncut portion.

In this embodiment, a concave portion formed on the machining surface Wf is referred to as an overcut Co, whereas a convex portion formed on the machining surface Wf is referred to as an undercut Cu. The overcut Co often occurs in the region before (short of) the approach point A in the machining direction while the undercut Cu often occurs in the region after (behind) the approach point A in the machining direction, so that the overcut Co and the undercut Cu occur adjacent to each other. However, an overcut Co or an undercut Cu may also occur in a region away from the approach point A, and thus there are also cases where the overcut Co and the undercut Cu do not occur adjacent to each other.

[How to Determine Overcut and Undercut]

Figure 4:
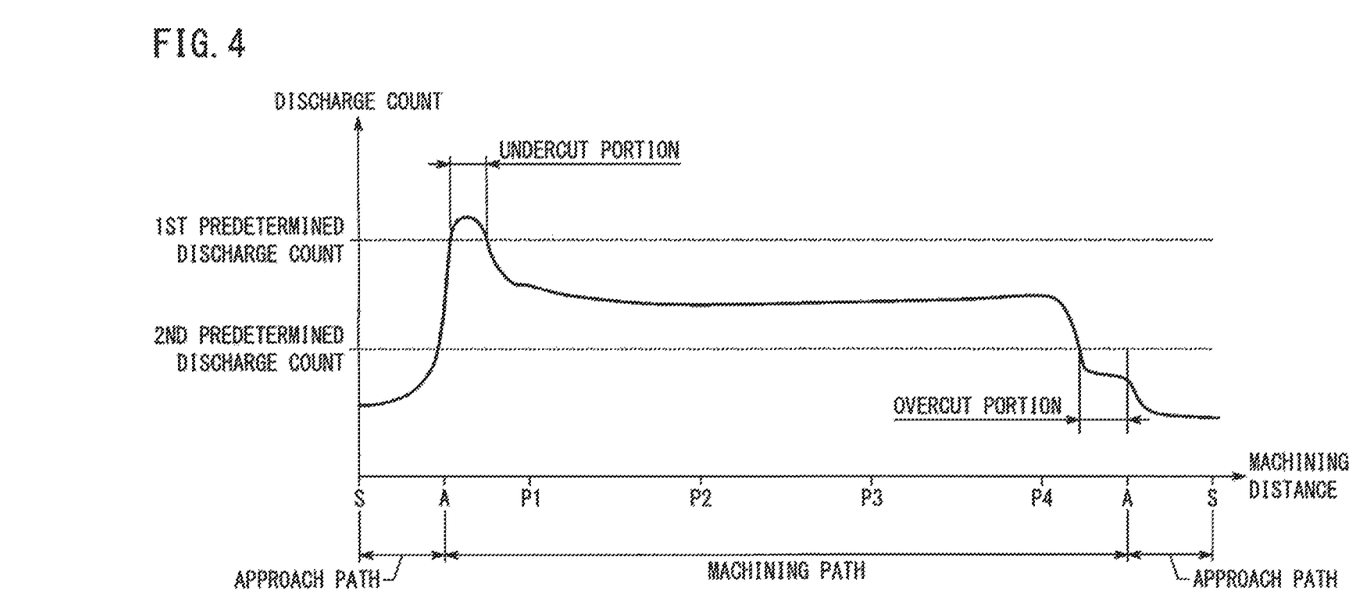
FIG. 4 is a graph showing the relationship between the discharge count and the machining distance by which the wire electrode has moved from the machining start point.

FIG. 4 is a graph showing the relationship between the discharge count and the machining distance by which the wire electrode 14 has moved from the machining start point S. S, A and P1 to P4 shown in FIG. 4 respectively denote the machining start point S, the approach point A, and the positions of the points P1 to P4 on the machining path R shown in FIG. 2B. FIG. 4 shows a graph of a state in which an overcut Co occurs in a region before the approach point A in the machining direction and an undercut Cu occurs in a region after the approach point A in the machining direction.

In the second machining, the machining path setting unit 32 specifies overcuts Co and undercuts Cu on the machining surface Wf according to the discharge count when the wire electrode 14 is moving on the machining path R. The machining path setting unit 32 specifies, as an undercut Cu, a portion where the discharge count is greater than a first predetermined discharge count. Further, the machining path setting unit 32 specifies, as an overcut Co, a portion where the discharge count is smaller than a second predetermined discharge count. It should be noted that the first predetermined discharge count is set to be greater than the second predetermined discharge count.

[Setting of Approach Point]

Figure 5:
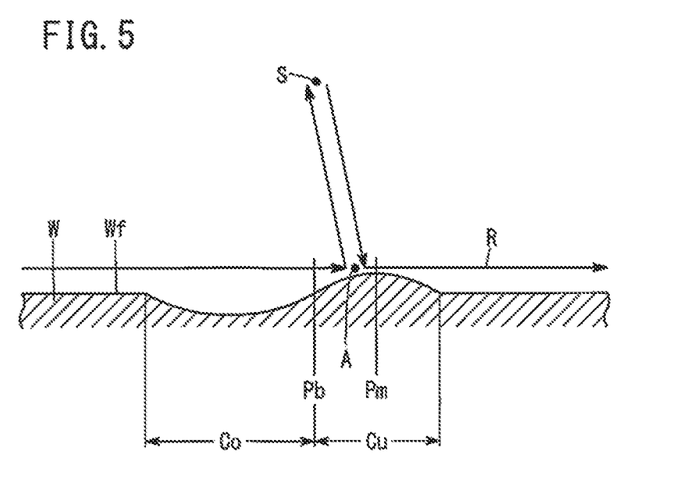
FIG. 5 is a diagram for explaining how a machining path setting unit sets an approach point and a machining path.

FIG. 5 is a diagram for explaining how the machining path setting unit 32 sets the approach point A and the machining path R. The machining path setting unit 32 sets the approach point A in the second finishing and in machining processes after the second finishing (hereinafter referred to as the third machining). The machining path setting unit 32 sets the approach point A so as to avoid the overcut Co. Preferably, the machining path setting unit 32 sets the approach point A at the undercut Cu.

More preferably, when the overcut Co and the undercut Cu reside adjacent to each other, the machining path setting unit 32 sets the approach point A at a position between the boundary point, designated at Pb, of the overcut Co and the undercut Cu, and the maximum undercut point designated at Pm where a machining insufficient amount is greatest in the region of the undercut Cu. More specifically, the machining path setting unit 32 sets the approach point A at a position closer to the maximum undercut point Pm in the undercut Cu as a machining excess amount of the overcut Co is greater than the machining insufficient amount of the undercut Cu. On the other hand, as the machining excess amount of the overcut Co is smaller than the machining insufficient amount of the undercut Cu, the machining path setting unit 32 sets the approach point A at a position closer to the boundary point Pb in the region of the undercut Cu.

The machining excess amount of the overcut Co (i.e., the excessively machined portion) may be defined by the depth of the overcut Co at the deepest point with respect to a predefined machining surface, or by the volume of a portion of the overcut Co recessed with respect to the predefined machining surface. In addition, the machining insufficient amount of the undercut Cu (i.e., the insufficiently machined portion) may be defined by the height of the undercut Cu at the highest point from the predefined machining surface, or by the volume of a portion of the undercut Cu protruding with respect to the predefined machining surface. Here, the maximum undercut point Pm of the undercut Cu may be set at a position where the height of the portion protruding from the predefined machining surface is greatest.

[Operation and Effect]

When the machining surface Wf of the workpiece W has an overcut Co (an excessively machined portion), if the overcut Co is subjected to a finishing process, the depth of the overcut Co becomes deeper, and thus a recessed dent may be left on the machining surface Wf.

Therefore, in the present embodiment, the machining path setting unit 32 is configured to set the approach point A so as to avoid the overcut Co in the finishing process at and after the third machining process. As described above, the overcut Co often occurs in the region before the approach point A in the machining direction because the wire electrode 14 comes close to the approach point A twice, i.e., at the start of machining and at the end of machining, resulting in excessive machining of the machining surface Wf. In the present embodiment, the machining path setting unit 32 sets the approach point A so as to avoid the overcut Co, and thus it is possible to prevent the overcut Co from being further machined, whereby the machining surface Wf can be machined with high accuracy.

Further, in the present embodiment, the machining path setting unit 32 is configured to set the approach point A in the range of the undercut Cu. This makes it possible to machine the undercut Cu more, and thus the machining surface Wf can be machined with high accuracy.

Further, according to the present embodiment, in the case where the overcut Co and the undercut Cu are adjacent to each other, the machining path setting unit 32 is configured to set the approach point A at a position between the boundary point Pb of the overcut Co and the undercut Cu, and the maximum undercut point Pm in the undercut Cu. As a result, it is possible to prevent the overcut Co from being further machined and also to machine the undercut Cu more, whereby the machining surface Wf can be machined with high accuracy.

Further, according to the present embodiment, in the case where the overcut Co and the undercut Cu are adjacent to each other, the machining path setting unit 32 is configured to set the approach point A at a position that is closer to the maximum undercut point Pm in the undercut Cu as the machining excess amount of the overcut Co is greater than the machining insufficient amount of the undercut Cu. On the other hand, as the machining excess amount of the overcut Co is smaller than the machining insufficient amount of the undercut Cu, the machining path setting unit 32 sets the approach point A at a position closer to the boundary point Pb in the region of the undercut Cu. As a result, it is possible to prevent the overcut Co from being further machined, whereas it is possible to machine the undercut Cu more, whereby the machining surface Wf can be machined with high accuracy.

Further, in the present embodiment, the machining path setting unit 32 is configured to designate, as an undercut Cu, a portion where the discharge count across the electrode gap is greater than a first predetermined discharge count. Further, the machining path setting unit 32 is configured to designate, as an overcut Co, a portion where the discharge count is smaller than a second predetermined discharge count. Thus, it is possible to designate or specify the overcut Co and the undercut Cu according to the discharge count which varies depending on the distance between the wire electrode 14 and the machining surface Wf of the workpiece W.

Second Embodiment

Figure 6:
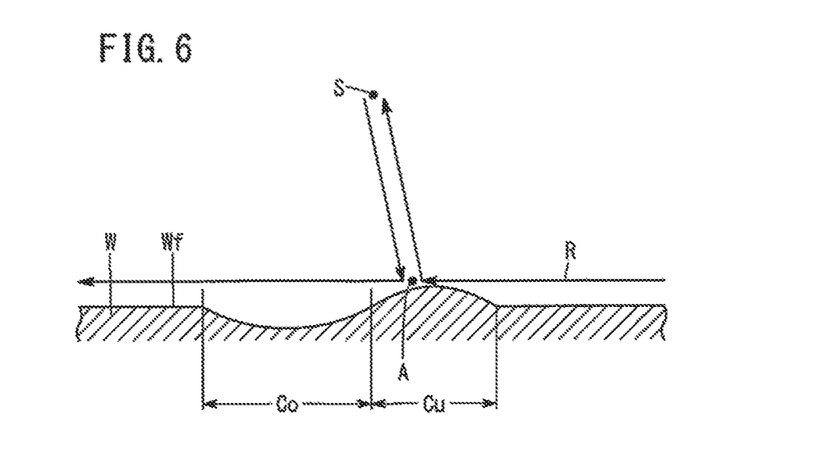
FIG. 6 is a diagram for explaining how a machining path setting unit sets an approach point and a machining path.

FIG. 6 is a diagram for explaining how the machining path setting unit 32 sets the approach point A and the machining path R. In this embodiment, in the finishing process at and after the third machining process, the machining path setting unit 32 sets the approach point A in the same manner as in the first embodiment, but it sets the machining direction so as to be opposite to the predetermined machining direction.

As described above, an overcut Co often occurs in the region before (i.e., short of) the approach point A in the machining direction whereas an undercut Cu often occurs in the region behind the approach point A in the machining direction. In other words, the cutting is excessive in the region before the approach point A, and the cutting is insufficient in the region behind the approach point A. By reversing the machining direction in the finishing process at the third or subsequent machining process, it is possible to prevent the overcut Co from being further machined, while it is possible to machine the undercut Cu more, whereby it is possible to finish the machining surface Wf with high accuracy.

Third Embodiment

Figure 7:
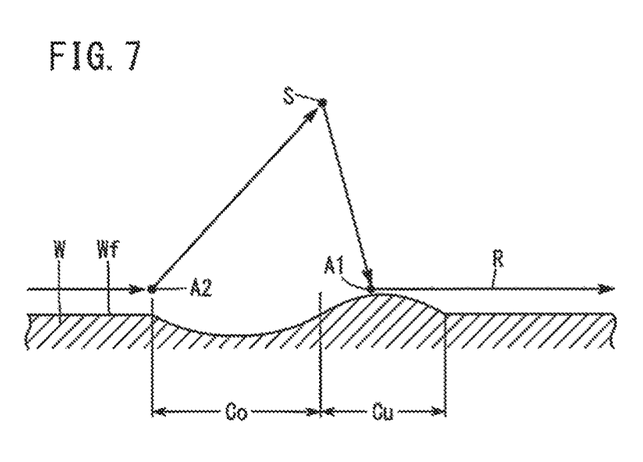
FIG. 7 is a diagram for explaining how a machining path setting unit sets an access point and a departure point.

FIG. 7 is a diagram for explaining how the machining path setting unit 32 sets an access point A1 and a departure point A2. In this embodiment, the departure point A2 is set at a position different from the access point A1. In the present embodiment, in the finishing process at and after the third machining, the machining path setting unit 32 sets the access point A1 in the same manner as the setting of the approach point A in the first embodiment, but it sets the departure point A2 at a position just before the overcut Co (the excessively machined portion) in the machining direction.

As a result, the overcut Co is not machined in the finishing process at and after the third machining. Thus, it is possible to prevent the overcut Co from being further machined, whereby the machining surface Wf can be machined with high accuracy.

Fourth Embodiment

Figure 8:
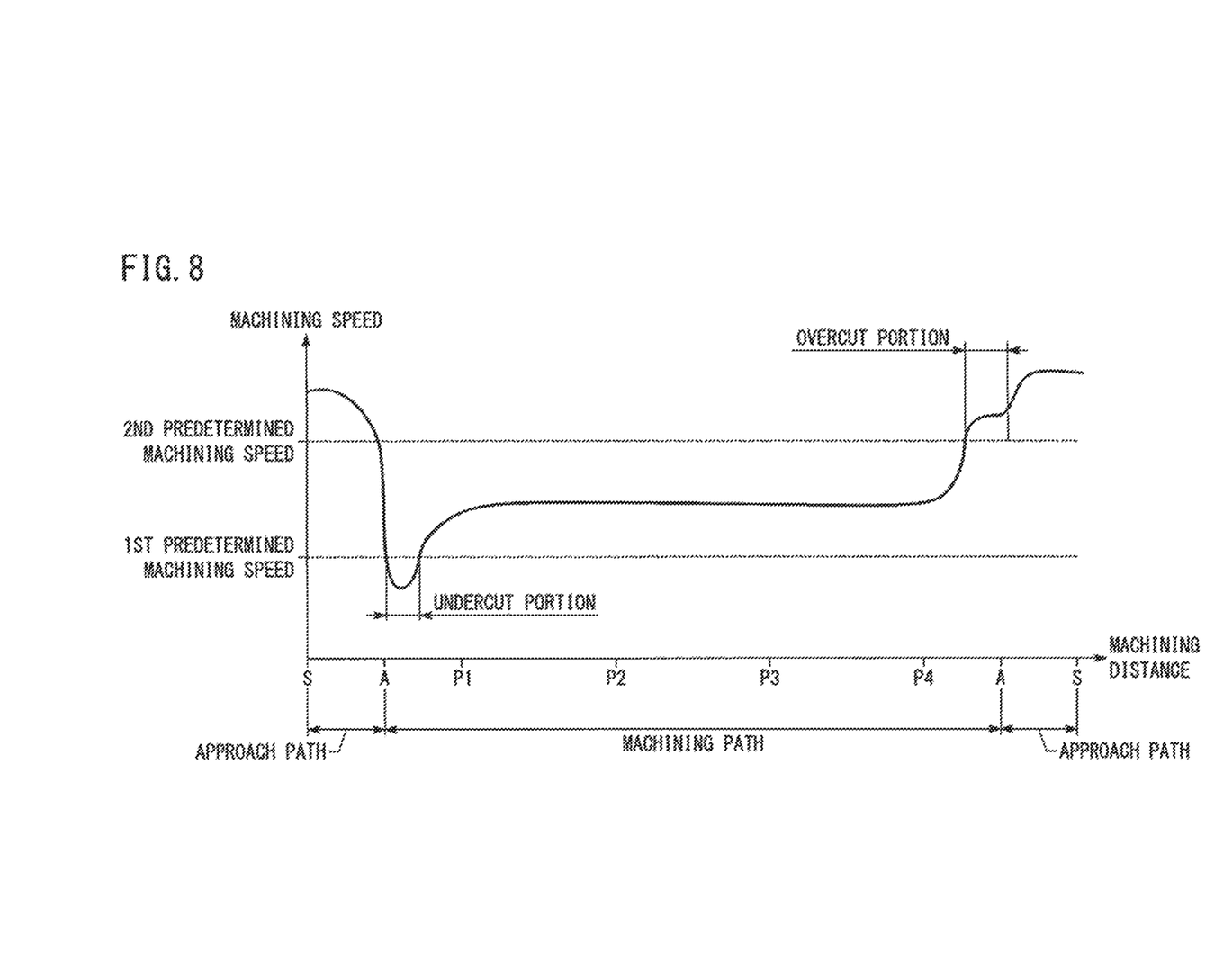
FIG. 8 is a graph showing the relationship between the machining speed and the machining distance by which the wire electrode has moved from the machining start point.

FIG. 8 is a graph showing the relationship between the machining speed and the machining distance the wire electrode 14 has moved from the machining start point S. S, A, and P1 to P4 shown in FIG. 8 respectively denote the machining start point S, the approach point A and points P1 to P4 on the machining path R shown in FIG. 2B. FIG. 8 shows a graph of a state in which an overcut Co occurs in a region before the approach point A in the machining direction and an undercut Cu is formed in a region after the approach point A in the machining direction.

In this embodiment, the machining surface state acquisition unit 30 determines, in the second machining, that the wire electrode 14 resides closer to the machining surface Wf of the workpiece W as the machining speed is lower, and that the wire electrode 14 resides farther from the machining surface Wf of the workpiece W as the machining speed is higher.

In the second machining, the machining path setting unit 32 designates or specifies an overcut Co and an undercut Cu of the machining surface Wf based on the machining speed at which the wire electrode 14 is moving on the machining path R. The machining path setting unit 32 designates, as an undercut Cu, a portion where the machining speed is lower than a previously set first predetermined speed. Further, the machining path setting unit 32 designates, as an overcut Co, a portion where the machining speed is higher than a previously set second predetermined speed. The first predetermined speed is set to be lower than the second predetermined speed.

As described above, the machining speed setting unit 28 sets the machining speed to be lower as the gap voltage is smaller and to be higher as the gap voltage is greater. In the second machining, when the distance between the wire electrode 14 and the workpiece W is larger, the number of times discharge is generated across the electrode gap decreases and the gap voltage increases. In other words, the machining path setting unit 32, instead of setting an overcut Co and an undercut Cu according to the discharge count across the gap as in the first embodiment, can set an overcut Co and an undercut Cu according to the machining speed in this embodiment.

Fifth Embodiment

Figure 9:
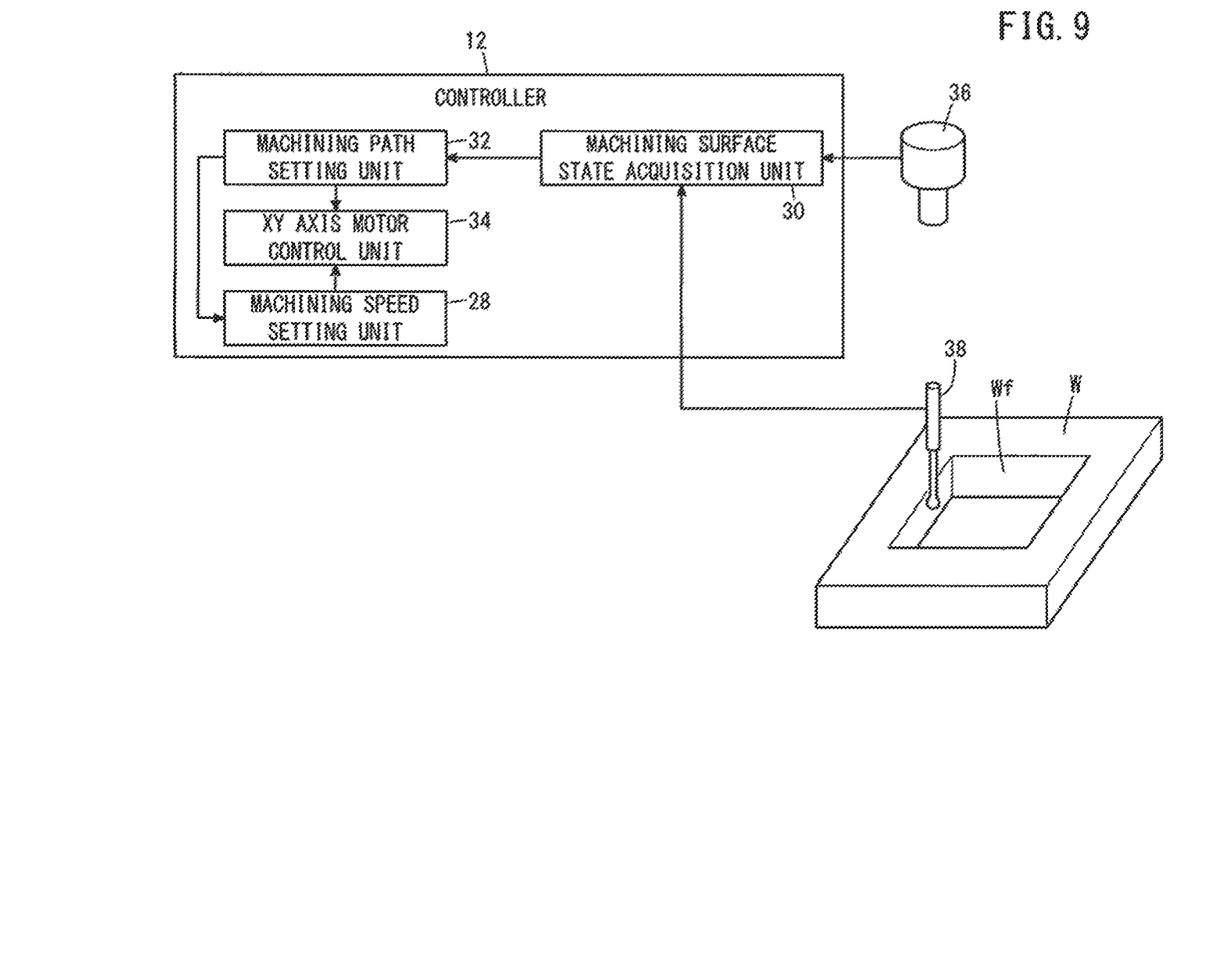
FIG. 9 is a system diagram for acquiring the shape of the machining surface of a workpiece by a camera or a touch probe.

FIG. 9 is a diagram of a system which acquires the shape of the machining surface Wf of a workpiece W by a camera 36 or a touch probe 38.

In this embodiment, after roughing, the machining surface state acquisition unit 30 acquires the shape of the machining surface Wf, based on image information obtained by image-taking the machining surface Wf of the workpiece W by the camera 36, or based on positional information obtained by a touch probe 38 when the touch probe 38 is brought into contact with the machining surface Wf.

Figure 10:
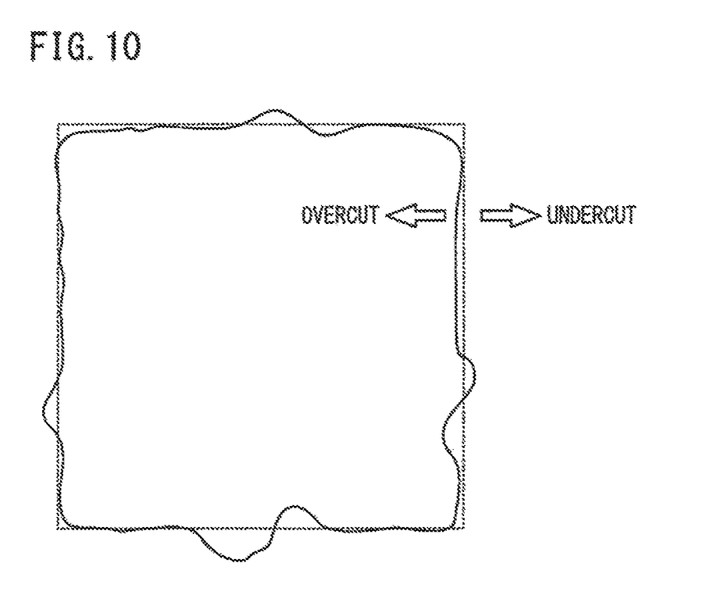
FIG. 10 is a diagram for explaining how a machining path setting unit specifies overcut portions and undercut portions.

FIG. 10 is a diagram for explaining how the machining path setting unit 32 specifies overcuts Co and undercuts Cu. In FIG. 10, the solid line shows the state of the machining surface Wf obtained by the machining surface state acquisition unit 30, and the dotted line shows a machining shape defined by the NC program.

In the present embodiment, the machining path setting unit 32 compares the state of the machining surface Wf acquired by the machining surface state acquisition unit 30 with the machining shape defined by the NC program to thereby specify overcuts Co and undercuts Cu. The machining path setting unit 32 designates, as overcuts Co, portions of the machining surface Wf that are located on the interior side of the NC-programmed machining shape, and also designates, as undercuts Cu, portions of the machining surface Wf that are located outside the NC-programmed machining shape.

The machining path setting unit 32 sets the approach point A for the second or subsequent machining, at an undercut Cu. In the first embodiment, the state of the machining surface Wf is collected by the machining surface state acquisition unit 30 at the time of performing the second machining. In the present embodiment, however, after the rough machining, the state of the machining surface Wf can be obtained. Since the approach point A can be set so as to avoid the overcut Co, at the second machining, it is possible to prevent the overcut Co from being further machined and finish the machining surface Wf with high accuracy.

[Technical Concepts Obtained from the Embodiment]

Technical concepts that can be grasped from the above embodiment will be described below.

The controller (12) for the wire electrical discharge machine (10) that machines the workpiece (W) along the machining path (R) by relatively moving the workpiece (W) and the wire electrode (14) to each other while generating electric discharge across the electrode gap between the workpiece (W) and the wire electrode (14), includes: the machining surface state acquisition unit (30) configured to acquire the state of the machining surface (Wf) of the workpiece (W); and the machining path setting unit (32) configured to specify the overcut (the excessively machined portion) (Co) of the workpiece (W) based on the acquired state of the machining surface (Wf) and set the access point (A, A1) at which the wire electrode (14) approaches the machining surface (Wf) from the machining start point (S), so as to avoid the overcut (Co). As a result, the machining path setting unit (32) can set the approach point (A, A1) so as to avoid the overcut (Co), thereby preventing the overcut (Co) from being further machined and machining the machining surface (Wf) with high accuracy.

In the above controller (12) for the wire electrical discharge machine (10), the machining path setting unit (32) may be configured to set the departure point (A2) at which the wire electrode (14) is moved away from the machining surface (Wf) and returned to the machining start point (S), at a position that is located before the overcut (Co) in the machining direction. As a result, since the overcut (Co) is not cut or machined, it is possible to prevent the overcut (Co) from being further machined, whereby the machining surface (Wf) can be machined with high accuracy.

In the above controller (12) for the wire electrical discharge machine (10), the machining path setting unit (32) may be configured to specify the undercut (the insufficiently machined portion) (Cu) of the workpiece (W) based on the acquired state of the machining surface (Wf) and set the access point (A, A1) at a position on the undercut (Cu). As a result, it is possible to machine the undercut (Cu) more, whereby the machining surface (Wf) can be machined with high accuracy.

In the above controller (12) for the wire electrical discharge machine (10), the machining path setting unit (32) may be configured to, in the case that the overcut (Co) and the undercut (Cu) are located adjacent to each other, set the access point (A, A1) at a position between the boundary point (Pb) between the overcut (Co) and the undercut (Cu), and the maximum undercut point (Pm) of the undercut (Cu) where the machining insufficient amount is greatest. As a result, it is possible to prevent the overcut (Co) from being further machined, whereas it is possible to machine the undercut (Cu) more, whereby the machining surface (Wf) can be machined with high accuracy.

In the above controller (12) for the wire electrical discharge machine (10), the machining path setting unit (32) may be configured to set the access point (A, A1) at a position that is closer to the maximum undercut point (Pm) of the undercut (Cu) where the machining insufficient amount is greatest as the machining excess amount of the overcut (Co) is greater than the machining insufficient amount of the undercut (Cu), and set the access point (A, A1) at a position that is closer to the boundary point (Pb) between the overcut (Co) and the undercut (Cu) as the machining excess amount of the overcut (Co) is smaller than the machining insufficient amount of the undercut (Cu). As a result, it is possible to prevent the overcut (Co) from being further machined, whereas it is possible to machine the undercut (Cu) more, whereby the machining surface (Wf) can be machined with high accuracy.

In the above controller (12) for the wire electrical discharge machine (10), the machining path setting unit (32) may be configured to set the machining direction so as to be opposite to a preset machining direction. As a result, it is possible to prevent the overcut (Co) from being further machined, whereas it is possible to machine the undercut (Cu) more, whereby the machining surface (Wf) can be machined with high accuracy.

In the above controller (12) for the wire electrical discharge machine (10), the machining surface state acquisition unit (30) may be configured to acquire the state of the machining surface (Wf) according to the discharge count across the electrode gap, and the machining path setting unit (32) may be configured to designate, as the undercut (Cu), a portion where the discharge count across the electrode gap is greater than a first predetermined discharge count. As a result, it is possible to set an undercut (Cu) according to the discharge count that varies depending on the distance of the machining surface (Wf) of the workpiece (W) from the wire electrode (14).

In the above controller (12) for the wire electrical discharge machine (10), the machining surface state acquisition unit (30) may be configured to acquire the state of the machining surface (Wf) according to the machining speed, and the machining path setting unit (32) may be configured to designate, as the undercut (Cu), a portion where the machining speed is lower than a first predetermined speed. As a result, it is possible to set an undercut (Cu) according to the machining speed which changes depending on the distance of the machining surface (Wf) of the workpiece (W) from the wire electrode (14).

In the above controller (12) for the wire electrical discharge machine (10), the machining surface state acquisition unit (30) may be configured to acquire the shape of the machining surface (Wf), based on image information taken by the camera (36) or positional information obtained by the touch probe (38) when the touch probe (38) is brought into contact with the machining surface (Wf), and the machining path setting unit (32) may be configured to designate the undercut (Cu) by comparing the acquired shape of the machining surface (Wf) with a machining shape of the machining surface (Wf) defined in advance. As a result, it is possible to acquire the state of the machining surface (Wf) after roughing and then set the undercut (Cu).

In the above controller (12) for the wire electrical discharge machine (10), the machining surface state acquisition unit (30) may be configured to acquire the state of the machining surface (Wf) according to the discharge count across the electrode gap, and the machining path setting unit (32) may be configured to designate, as the overcut (Co), a portion where the discharge count across the electrode gap is smaller than a second predetermined discharge count. As a result, it is possible to set the overcut (Co) in accordance with the discharge count which changes depending on the distance of the machining surface (Wf) of the workpiece (W) from the wire electrode (14).

In the above controller (12) for the wire electrical discharge machine (10), the machining surface state acquisition unit (30) may be configured to acquire the state of the machining surface (Wf) according to the machining speed, and the machining path setting unit (32) may be configured to designate, as the overcut (Co), a portion where the machining speed is higher than a second predetermined speed. As a result, it is possible to set the overcut (Co) according to the machining speed which varies depending on the distance of the machining surface (Wf) of the workpiece (W) from the wire electrode (14).

In the above controller (12) for the wire electrical discharge machine (10), the machining surface state acquisition unit (30) may be configured to acquire the shape of the machining surface (Wf), based on image information taken by the camera (36) or positional information obtained by the touch probe (38) when the touch probe (38) is brought into contact with the machining surface (Wf), and the machining path setting unit (32) may be configured to designate the overcut (Co) by comparing the acquired shape of the machining surface (Wf) with a machining shape of the machining surface (Wf) defined in advance. As a result, it is possible to acquire the state of the machining surface (Wf) after roughing and set the overcut (Co).

A control method for the wire electrical discharge machine (10) that machines the workpiece (W) along the machining path (R) by relatively moving the workpiece (W) and the wire electrode (14) to each other while generating electric discharge across the electrode gap between the workpiece (W) and the wire electrode (14) includes: a machining surface state acquiring step of acquiring the state of the machining surface (Wf) of the workpiece (W); and a machining path setting step of specifying an overcut (Co) of the workpiece (W) based on the acquired state of the machining surface (Wf), and setting the access point (A, A1) at which the wire electrode (14) approaches the machining surface (Wf) from the machining start point (S), so as to avoid the overcut (Co). As a result, the machining path setting unit (32) can set the approach point (A, A1) so as to avoid the overcut (Co), thereby preventing the overcut (Co) from being further machined and machining the machining surface (Wf) with high accuracy.

In the above control method for the wire electrical discharge machine (10), the machining path setting step may set the departure point (A2) at which the wire electrode (14) is moved away from the machining surface (Wf) and returned to the machining start point (S), at a position that is located before the overcut (Co) in the machining direction. As a result, since the overcut (Co) is not cut or machined, and thus it is possible to prevent the overcut (Co) from being further machined and machine the machining surface (Wf) with high accuracy.

In the control method for the wire electrical discharge machine (10), the machining path setting step may specify the undercut (Cu) of the workpiece (W) based on the acquired state of the machining surface (Wf), and set the access point (A, A1) at a position on the undercut (Cu). As a result, it is possible to machine the undercut (Cu) more and thereby machine the machining surface (Wf) with high accuracy.

The present invention is not particularly limited to the embodiments described above, and various modifications are possible without departing from the essence and gist of the present invention.

What is claimed is:

1. A controller for a wire electrical discharge machine that machines a workpiece along a machining path by moving the workpiece and a wire electrode relative to each other while generating electric discharge across an electrode gap between the workpiece and the wire electrode, comprising:
   a machining surface state acquisition unit configured to acquire a state of a machining surface of the workpiece; and
   a machining path setting unit configured to specify an excessively machined portion of the workpiece based on the acquired state of the machining surface and set an access point at which the wire electrode approaches the machining surface from a machining start point, so as to avoid the excessively machined portion, wherein:
   the machining surface state acquisition unit is configured to acquire the state of the machining surface according to a discharge count across the electrode gap; and
   the machining path setting unit is configured to designate, as the excessively machined portion, a portion where the discharge count across the electrode gap is smaller than a second predetermined discharge count.

2. The controller for the wire electrical discharge machine according to claim 1, wherein the machining path setting unit is configured to set a departure point at which the wire electrode is moved away from the machining surface and returned to the machining start point, at a position that is located before the excessively machined portion in a machining direction.

3. The controller for the wire electrical discharge machine according to claim 1, wherein the machining path setting unit is configured to specify an insufficiently machined portion of the workpiece based on the acquired state of the machining surface and set the access point at a position on the insufficiently machined portion.

4. The controller for the wire electrical discharge machine according to claim 3, wherein the machining path setting unit is configured to, in a case that the excessively machined portion and the insufficiently machined portion are located adjacent to each other, set the access point at a position between a boundary point between the excessively machined portion and the insufficiently machined portion, and a maximum insufficiently-machined point of the insufficiently machined portion where a machining insufficient amount is greatest.

5. The controller for the wire electrical discharge machine according to claim 4, wherein the machining path setting unit is configured to set the access point at a position that is closer to the maximum insufficiently-machined point of the insufficiently machined portion where the machining insufficient amount is greatest as a machining excess amount of the excessively machined portion is greater than the machining insufficient amount of the insufficiently machined portion, and set the access point at a position that is closer to the boundary point between the excessively machined portion and the insufficiently machined portion as the machining excess amount of the excessively machined portion is smaller than the machining insufficient amount of the insufficiently machined portion.

6. The controller for the wire electrical discharge machine according to claim 4, wherein the machining path setting unit is configured to set a machining direction so as to be opposite to a preset machining direction.

7. The controller for the wire electrical discharge machine according to claim 3, wherein:
   the machining surface state acquisition unit is configured to acquire the state of the machining surface according to a discharge count across the electrode gap; and
   the machining path setting unit is configured to designate, as the insufficiently machined portion, a portion where the discharge count across the electrode gap is greater than a first predetermined discharge count.

8. The controller for the wire electrical discharge machine according to claim 3, wherein:
   the machining surface state acquisition unit is configured to acquire the state of the machining surface according to a machining speed; and
   the machining path setting unit is configured to designate, as the insufficiently machined portion, a portion where the machining speed is lower than a first predetermined speed.

9. The controller for the wire electrical discharge machine according to claim 3, wherein:
   the machining surface state acquisition unit is configured to acquire a shape of the machining surface, based on image information taken by a camera or positional information obtained by a touch probe when the touch probe is brought into contact with the machining surface; and
   the machining path setting unit is configured to designate the insufficiently machined portion by comparing the acquired shape of the machining surface with a machining shape of the machining surface defined in advance.

10. The controller for the wire electrical discharge machine according to claim 1, wherein:
the machining surface state acquisition unit is configured to acquire the state of the machining surface according to a machining speed; and
the machining path setting unit is configured to designate, as the excessively machined portion, a portion where the machining speed is higher than a second predetermined speed.

11. The controller for the wire electrical discharge machine according to claim 1, wherein:
the machining surface state acquisition unit is configured to acquire a shape of the machining surface, based on image information taken by a camera or positional information obtained by a touch probe when the touch probe is brought into contact with the machining surface; and
the machining path setting unit is configured to designate the excessively machined portion by comparing the acquired shape of the machining surface with a machining shape of the machining surface defined in advance.

12. A control method for a wire electrical discharge machine that machines a workpiece along a machining path by moving the workpiece and a wire electrode relative to each other while generating electric discharge across an electrode gap between the workpiece and the wire electrode, comprising:
a machining surface state acquiring step of acquiring a state of a machining surface of the workpiece;
a machining path setting step of specifying an excessively machined portion of the workpiece based on the acquired state of the machining surface, and setting an access point at which the wire electrode approaches the machining surface from a machining start point, so as to avoid the excessively machined portion;
acquiring the state of the machining surface according to a discharge count across the electrode gap; and
designating, as the excessively machined portion, a portion where the discharge count across the electrode gap is smaller than a second predetermined discharge count.

13. The control method for the wire electrical discharge machine according to claim 12, wherein the machining path setting step sets a departure point at which the wire electrode is moved away from the machining surface and returned to the machining start point, at a position that is located before the excessively machined portion in a machining direction.

14. The control method for the wire electrical discharge machine according to claim 12, wherein the machining path setting step specifies an insufficiently machined portion of the workpiece based on the acquired state of the machining surface, and sets the access point at a position on the insufficiently machined portion.

* * * * *